(12) United States Patent
Arokiaraj et al.

(10) Patent No.: US 12,253,379 B2
(45) Date of Patent: Mar. 18, 2025

(54) MAPPING PREFERRED LOCATIONS USING MULTIPLE ARROWS

(71) Applicant: Airbnb, Inc., San Francisco, CA (US)

(72) Inventors: Francis Sujai Arokiaraj, Bangalore (IN); Senthil Venkatesan, Bangalore (IN)

(73) Assignee: Airbnb, Inc., San Francisco, CA (US)

( * ) Notice: Subject to any disclaimer, the term of this patent is extended or adjusted under 35 U.S.C. 154(b) by 0 days.

(21) Appl. No.: 18/242,153

(22) Filed: Sep. 5, 2023

(65) Prior Publication Data

US 2023/0408282 A1 Dec. 21, 2023

Related U.S. Application Data

(63) Continuation of application No. 17/328,179, filed on May 24, 2021, now Pat. No. 11,781,879, which is a continuation of application No. 16/256,288, filed on Jan. 24, 2019, now Pat. No. 11,047,703, which is a continuation of application No. 15/221,986, filed on
(Continued)

(51) Int. Cl.
| | |
|---|---|
| *G01C 21/36* | (2006.01) |
| *G06F 3/0482* | (2013.01) |
| *G06F 3/04847* | (2022.01) |

(52) U.S. Cl.
CPC ..... *G01C 21/3632* (2013.01); *G01C 21/3614* (2013.01); *G01C 21/367* (2013.01); *G01C 21/3682* (2013.01); *G06F 3/0482* (2013.01); *G06F 3/04847* (2013.01); *G06F 2203/04804* (2013.01)

(58) Field of Classification Search
CPC ............ G01C 21/3632; G01C 21/3614; G01C 21/367; G01C 21/3682; G06F 3/0482; G06F 3/04847; G06F 2203/04804
See application file for complete search history.

(56) References Cited

U.S. PATENT DOCUMENTS

| | | |
|---|---|---|
| 6,430,501 B1 | 8/2002 | Slominski |
| 6,903,723 B1 * | 6/2005 | Forest .................. G06F 3/0483 345/157 |

(Continued)

FOREIGN PATENT DOCUMENTS

WO  WO-2014005979 A1   1/2014

OTHER PUBLICATIONS

"U.S. Appl. No. 14/598,278, Non Final Office Action mailed Mar. 28, 2016", 13 pgs.

(Continued)

*Primary Examiner* — Ashley L Redhead, Jr.
(74) *Attorney, Agent, or Firm* — Schwegman Lundberg & Woessner, P.A.

(57) ABSTRACT

A method for depicting location attributes in a map environment. The method includes receiving a request for parameters about a first type of location. The method includes determining a first set of directional arrows, where each directional arrow is associated with a location and has a first set of properties based on the parameters about the first type of location. The method further includes determining a selection of a first directional arrow, which is associated with a first location, from the first set of directional arrows. Modifications to the first set of directional arrows are made based on the selection of the first directional arrow.

20 Claims, 6 Drawing Sheets

Related U.S. Application Data

Jul. 28, 2016, now Pat. No. 10,228,262, which is a continuation of application No. 14/598,278, filed on Jan. 16, 2015, now Pat. No. 9,470,545, which is a continuation of application No. 14/314,076, filed on Jun. 25, 2014, now Pat. No. 9,605,972.

(56) References Cited

U.S. PATENT DOCUMENTS

| | | |
|---|---|---|
| 7,519,469 B2 | 4/2009 | De et al. |
| 8,032,297 B2 | 10/2011 | Jakobson |
| 8,060,298 B2 | 11/2011 | Cheung et al. |
| 8,577,594 B2 | 11/2013 | Alberth, Jr. et al. |
| 8,589,069 B1 | 11/2013 | Lehman |
| 8,671,365 B2 | 3/2014 | Berus |
| 8,880,347 B1 | 11/2014 | Hightower et al. |
| 9,074,898 B2 | 7/2015 | Ozawa et al. |
| 9,244,940 B1 | 1/2016 | Donsbach et al. |
| 9,470,545 B2 | 10/2016 | Arokiaraj et al. |
| 9,605,972 B2 | 3/2017 | Arokiaraj et al. |
| 10,228,262 B2 | 3/2019 | Arokiaraj et al. |
| 11,047,703 B2 | 6/2021 | Arokiaraj et al. |
| 2004/0113955 A1 | 6/2004 | Kosugi |
| 2005/0273256 A1 | 12/2005 | Takahashi |
| 2006/0259238 A1 | 11/2006 | Jung et al. |
| 2008/0262714 A1* | 10/2008 | Abramovich Ettinger ................. G01C 21/34 701/533 |
| 2009/0169060 A1 | 7/2009 | Faenger et al. |
| 2010/0058225 A1* | 3/2010 | Lin .................... G01C 21/3682 715/785 |
| 2010/0115459 A1 | 5/2010 | Kinnunen et al. |
| 2010/0131850 A1* | 5/2010 | Berus .................. G01C 21/367 715/862 |
| 2010/0225756 A1 | 9/2010 | Miyata |
| 2010/0248745 A1 | 9/2010 | Ozawa et al. |
| 2011/0264370 A1* | 10/2011 | Jakobson ............. G08G 1/0969 345/441 |
| 2012/0120115 A1 | 5/2012 | Sato |
| 2012/0158227 A1 | 6/2012 | Tate, Jr. et al. |
| 2012/0179361 A1 | 7/2012 | Mineta et al. |
| 2012/0303268 A1 | 11/2012 | Su et al. |
| 2013/0103313 A1 | 4/2013 | Moore et al. |
| 2013/0131986 A1 | 5/2013 | Van et al. |
| 2013/0325481 A1* | 12/2013 | van Os .................. G06F 3/167 704/E21.001 |
| 2015/0038161 A1 | 2/2015 | Jakobson et al. |
| 2015/0377628 A1 | 12/2015 | Arokiaraj et al. |
| 2015/0377643 A1 | 12/2015 | Arokiaraj et al. |
| 2016/0003621 A1* | 1/2016 | Koenig .................. G01C 21/20 |
| 2016/0334240 A1 | 11/2016 | Arokiaraj et al. |
| 2019/0154459 A1 | 5/2019 | Arokiaraj et al. |
| 2021/0278236 A1 | 9/2021 | Arokiaraj et al. |

OTHER PUBLICATIONS

"U.S. Appl. No. 14/598,278, Notice of Allowance mailed Jul. 1, 2016", 7 pgs.

"U.S. Appl. No. 14/598,278, Response filed Jun. 14, 2016 to Non Final Office Action mailed Mar. 28, 2016", 11 pgs.

"U.S. Appl. No. 15/221,986, Non Final Office Action mailed Jun. 15, 2018", 13 pgs.

"U.S. Appl. No. 15/221,986, Notice of Allowance mailed Oct. 26, 2018", 9 pgs.

"U.S. Appl. No. 15/221,986, Response filed Sep. 11, 2018 to Non Final Office Action mailed Jun. 15, 2018", 14 pgs.

"U.S. Appl. No. 16/256,288, Non Final Office Action mailed Sep. 4, 2020", 36 pgs.

"U.S. Appl. No. 16/256,288, Notice of Allowance mailed Feb. 24, 2021", 8 pgs.

"U.S. Appl. No. 16/256,288, Response filed Nov. 23, 2020 to Non Final Office Action mailed Sep. 4, 2020", 16 pgs.

"U.S. Appl. No. 17/328,179, Non Final Office Action mailed Jan. 10, 2023", 17 pgs.

"U.S. Appl. No. 17/328,179, Notice of Allowance mailed Jun. 12, 2023", 10 pgs.

"U.S. Appl. No. 17/328,179, Response filed Mar. 3, 2023 to Non Final Office Action mailed Jan. 10, 2023", 10 pgs.

"List of IBM Patents or Patent Applications Treated as Related; {Appendix P}", IBM, (Sep. 14, 2018), 2 pgs.

Duckham, et al., ""Simplest" Paths: Automated Route Selection for Navigation", National Center for Geographic Information and Analysis, University of Maine, Orono, ME 04469, USA, W. Kuhn, M.F. Worboys, and S. Timpf {Eds.), (2003), 169-185.

* cited by examiner

MAPPING PREFERRED LOCATIONS USING MULTIPLE ARROWS

This application is a continuation of U.S. patent application Ser. No. 17/328,179, filed May 24, 2021, which is a continuation of U.S. patent application Ser. No. 16/256,288, filed Jan. 24, 2019, which is a continuation of U.S. patent application Ser. No. 15/221,986, filed Jul. 28, 2016, which is a continuation of U.S. patent application Ser. No. 14/598,278, filed Jan. 16, 2015, which is a continuation of U.S. patent application Ser. No. 14/314,076, filed Jun. 25, 2014, all of which are incorporated by reference herein in their entirety.

BACKGROUND OF THE INVENTION

The present invention relates generally to the field of map locations, and more particularly to depicting location attributes in a map environment.

Map services may be implemented with various devices, such as computing devices, mobile devices, and Global Positioning Systems (GPS). Most map services are capable of displaying an image of a map environment, which may include points of interest, an origin and/or a destination point, and traffic conditions among other depictions, each represented by varying map icons. The map icons can display useful information to a user, such as a street address of a point of interest. A point of interest may be, for example, a restaurant, a gas station, or a hospital.

Map services often allow a user to search for points of interest in a specific geographical area, and the map service returns a results list with multiple points of interest in the specified geographical area. Map services may also determine a route, such as a shortest distance route or a lowest traffic route, between two specified points of interest. Map services often allow a user to interact with a map environment. For example, a user may zoom in on a map display to get a more detailed image of a smaller area, or a user may zoom out from the map display to get broader information about a larger area.

SUMMARY

According to one embodiment of the present invention, a method for depicting location attributes in a map environment is provided. The method for depicting location attributes in a map environment may include receiving a request for parameters about a first type of location. The method may include determining a first set of directional arrows, where each directional arrow is associated with at least one location and has a set of properties based on parameters about the first type of location. The method may include determining that a first directional arrow that is associated with a first location has been selected from the first set of directional arrows. The method may include modifying one or more of the first set of directional arrows based on the selection of the first directional arrow.

DETAILED DESCRIPTION

Currently, there are many user functions that may help a user better navigate a map environment. Displaying the points of interest, traffic conditions, and the zoom function on a map are each functions that may make a map environment easier to navigate and better display the desired information to a user. Embodiments of the present invention seek to provide a method for displaying the direction and distance of preferred locations using a multiple arrow icon in a map environment.

Figure 1:
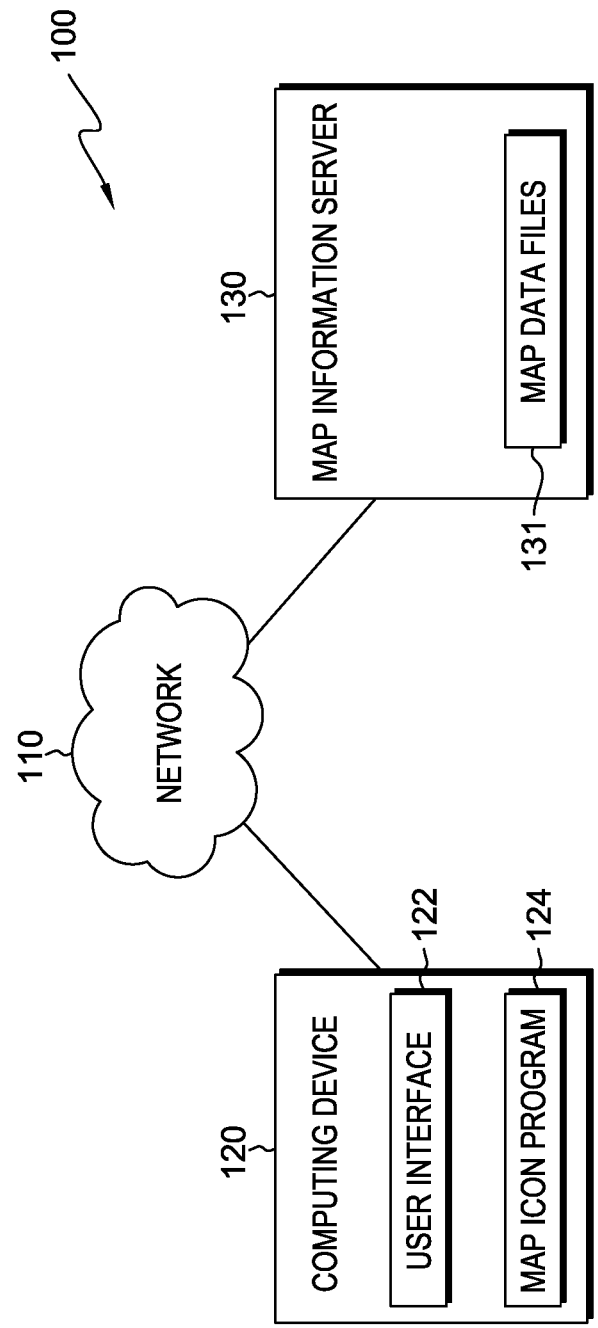
FIG. 1 is a functional block diagram illustrating an environment, in accordance with an embodiment of the present invention.

The present invention will now be described in detail with reference to the Figures. FIG. 1 is a functional block diagram illustrating an environment, generally designated 100, in accordance with one embodiment of the present invention. Modifications to environment 100 may be made by those skilled in the art without departing from the scope of the invention as recited by the claims. In an exemplary embodiment, environment 100 includes computing device 120 and map information server 130, all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication between computing device 120 and map information server 130.

Map information server 130 contains map data files 131. Map information server 130 may be a management server, a web server, or any other electronic device or computing system capable of receiving and sending data. In other embodiments, map information server 130 can be a laptop computer, a tablet computer, a netbook computer, a personal computer (PC), a desktop computer, a personal digital assistant (PDA), a smart phone, or any programmable electronic device capable of communicating with computing device 120 via network 110 and with various components and devices within environment 100. In other embodiments of the present invention, map information server 130 can represent a computing system utilizing clustered computers and components to act as a single pool of seamless resources when accessed through a network. In the exemplary embodiment, map information server 130 is capable of processing requests for map environment information from map icon program 124, located on computing device 120. Map information server 130 may include internal and external hardware components, as depicted and described in further detail with respect to FIG. 4.

Map data files 131 includes information detailing a map environment. In the exemplary embodiment, map data files 131 includes detailed parameter information, such as points of interest, roadways, and/or distances, among other information, for a location or area.

Computing device 120 includes user interface (UI) 122 and map icon program 124. Computing device 120 may be a laptop computer, a tablet computer, a netbook computer, a personal computer (PC), a desktop computer, a personal digital assistant (PDA), a smart phone, a thin client, or any programmable electronic device capable of communicating with map information server 130 via network 110. Computing device 120 may include internal and external hardware components, as depicted and described in further detail with respect to FIG. 4.

UI 122 may be, for example, a graphical user interface (GUI) or a web user interface (WUI) and can display text, documents, web browser windows, user options, application interfaces, and instructions for operation, and includes the information (such as graphic, text, and sound) a program presents to a user and the control sequences the user employs to control the program. In the exemplary embodiment, UI 122 allows a user to interact with map icon program 124 through electronic devices, such as a computer keyboard and/or cursor control devices, such as a computer mouse or touchpad, and through graphical icons and visual indicators, such as secondary notation, as opposed to text-based interfaces, typed command labels, or text navigation.

In the exemplary embodiment, map icon program 124 is a software application capable of receiving information, such as a user input, via UI 122. Although depicted as a separate component, in an embodiment, map icon program 124 may be partially or fully integrated with UI 122. In the exemplary embodiment, map icon program 124 is capable of communicating with map information server 130 and retrieving parameter information, such as map data files 131, via network 110. In other embodiments, map icon program 124 is fully or partially integrated within a web-based map service, which retrieves a set of parameters from a server associated with the web-based map service. In yet another embodiment, map icon program 124 retrieves the requested parameters using a software program or a plug-in service.

Figure 2:
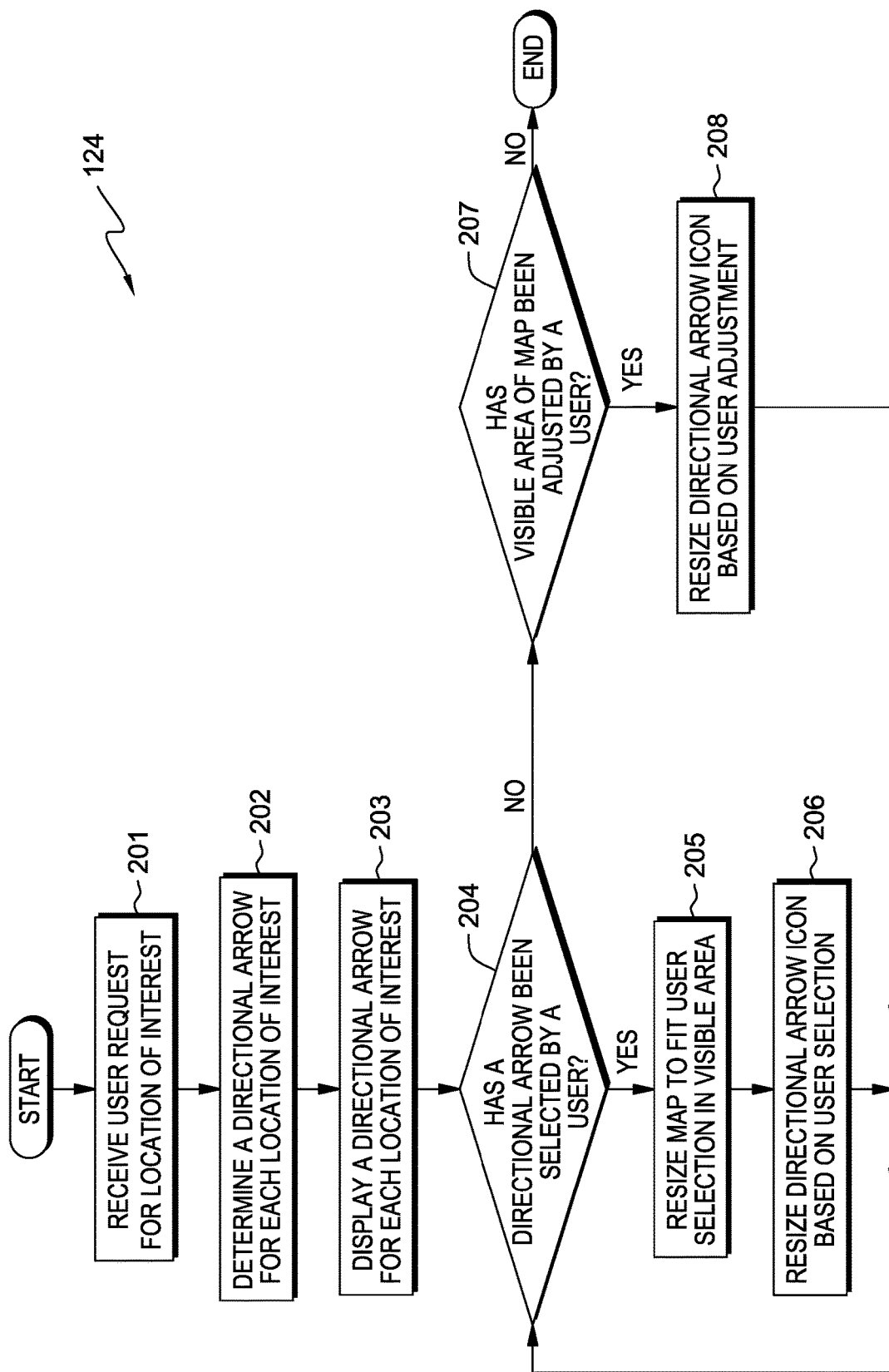
FIG. 2 is a flowchart depicting operational steps of a map icon program for depicting location attributes in a map environment, in accordance with an embodiment of the present invention.

FIG. 2 is a flowchart depicting operational steps of map icon program 124 for depicting location attributes in a map environment, in accordance with an embodiment of the present invention.

Map icon program 124 receives a request from a user of computing device 120, for information about a location of interest (step 201). In the exemplary embodiment, map icon program 124 retrieves the requested information about a location of interest from map data files 131, located on map information server 130. For example, a user may request information about a type of location, such as a gas station, a restaurant, or a park. The requested information may include information about parameters, such as, the distance from an origin point, a user rating, traffic data, and/or cost information. In the exemplary embodiment, a user also specifies a geographical area for map icon program 124 to search, the number of search results for map icon program 124 to return to the user, and which parameter information about the specified location for map icon program 124 to search. For example, a user may request information regarding gas stations with the lowest fuel cost within a five (5) mile radius from a point of origin, with the search limited to five (5) returned search results.

Map icon program 124 determines properties associated with a directional arrow for each location of interest searched by a user (step 202). In the exemplary embodiment, map icon program 124 determines a direction and a distance, from the point of origin indicated by a user, to each location of interest. Map icon program 124 creates a directional arrow based on the determined direction and distance, with the length of the directional arrow being proportional to the distance. For example, if the location represented by the first directional arrow is two (2) miles from the point of origin, and the location represented by the second directional arrow is one (1) mile from the point of origin, map icon program 124 may create a first directional arrow of a length that is twice the length of a second directional arrow. In other embodiments, map icon program 124 determines additional parameters for each location of interest, such as a user rating, an average price, and/or the current traffic to the location of interest. For example, if a restaurant represented by a first directional arrow has an average user rating of four (4) stars and a restaurant represented by a second directional arrow has an average user rating of two (2) stars, map icon program 124 may create the first directional arrow of a length that is twice the length of the second directional arrow.

In one embodiment, map icon program 124 determines a weight for each directional arrow to reflect the distance from the point of origin indicated by a user to a location of interest. For example, a directional arrow with a heavier weight may indicate that a location of interest is a closer distance to the point of origin than a directional arrow with a lighter weight (depicted in FIG. 3A). In other embodiments, the weight on each directional arrow represents a second set of parameters for a location. For example, if a user is searching for gas stations in a geographic region, the length and the direction of a directional arrow may indicate to a user the relative distance and direction of a location of interest from a point of origin on a map while, simultaneously, the weight of each directional arrow may show a fuel price, where a heavier weighted directional arrow may indicate a higher fuel cost.

In another embodiment, the directional arrow representing a location of interest that is the closest distance to the point of origin may be shown as a different color than the directional arrows representing the other locations of interest. For example, a user may select an input to depict the directional arrow representing the location of interest that is the closest distance to the point of origin in green, while the directional arrows representing the other locations of interest are depicted in red. In another embodiment, a color of the directional arrow may be used to represent a type of location when more than one type of location is searched by a user. For example, a red directional arrow may be used to represent gas stations, and a blue directional arrow may be used to represent restaurants. In yet another embodiment, multiple directional arrow attributes are implemented to represent multiple sets of parameters about a location of interest. For example, if a user is searching for restaurants in a geographic region, the length and the direction of each directional arrow may indicate to a user the relative distance and direction of a restaurant from a point of origin. In the same example, simultaneously, the weight of each directional arrow may correspond to an average menu price, where a heavier weighted directional arrow may indicate a higher average menu price while, simultaneously, the color of the arrow may represent an average customer rating, where a darker shade of red indicates a higher average customer rating, and a lighter shade of red indicates a lower average customer rating.

Map icon program 124 displays the determined directional arrows for each location of interest (step 203). In the exemplary embodiment, map icon program 124 displays all of the determined directional arrows pointing to the respective location of interest as one icon, called the directional arrow icon. The movement of the directional arrow icon is reflective of a cursor movement, controlled by a user of a mouse device. Map icon program 124 is able to determine the movement of the cursor by communicating with the operating system of the computing device, which can determine whether a selection has been made in the user interface or if the mouse device is hovering (stopping movement while the cursor is within the bounds of an area) over an area. In other embodiments, a user does not use a mouse device to control the directional arrow icon movement, and the directional arrow icon will move responsive to a different user implementation, for example, a user touching the display screen of a tablet device. In the exemplary embodiment, a map icon is displayed at the determined location of interest in the visible region of the map or, if the location of interest is not within the visible region of the map, a ghost image is displayed next to the associated directional arrow. A ghost image is a transparent map image of a location of interest that is located outside the visible area of the map (depicted in FIG. 3A). In other embodiments, the ghost image, associated with a location of interest that is outside the visible area of the map, has the distance from the point of origin written on or near it.

Map icon program 124 determines whether a directional arrow has been selected by a user of the computing device (decision block 204). In the exemplary embodiment, the directional arrow icon follows the cursor movement controlled by a user of a mouse device. The directional arrows and ghost images become selectable when a user of the computing device invokes a function key on the keyboard. By subsequently invoking the same function key on the keyboard a second time, or by invoking a different function key, the directional arrow icon reverts back to follow the cursor movement controlled by a user of a mouse device. For example, a user may press a function key on the keyboard, such as F2, which causes the directional arrow icon to stop movement responsive to the mouse device, and causes each directional arrow and each ghost image to become clickable links, which a user may select by clicking on the desired directional arrow, using a mouse device. A user may then press the F2 key a second time, causing the directional arrow icon to revert back to following the cursor movement, controlled by a user of the mouse. In other embodiments, a user does not use a mouse device to interact with a user interface and selects a directional arrow from the directional arrow icon by interacting directly with the display screen. For example, a user of a touch-screen tablet device may select a directional arrow from the directional arrow icon by touching the directional arrow directly on the display screen.

If a directional arrow has been selected by a user of the computing device (decision block 204, YES branch), map icon program 124 resizes the map image to fit the location of interest, selected by a user, in the visible map area (step 205). In the exemplary embodiment, map icon program 124 automatically resizes the map image responsive to a user selecting a directional arrow in order to fit the location of interest associated with the selected directional arrow, as well as the point of origin, in the visible map area. In the same embodiment, a location of interest that was not selected by the user may automatically become visible in the resized map if the location is in the same direction and closer to the point of origin than the selected location of interest. For example, in order to fit a selected location of interest that is a significant distance from the point of origin in the visible map area, map icon program 124 may need to zoom out the map image in order to show a larger area in the visible range of the map image, and this may allow a second location of interest to be in the visible range as well (detailed in FIG. 3B). In other embodiments, map icon program 124 determines that the location of interest is within the visible map area and the map image does not need to be resized.

Map icon program 124 resizes the directional arrow icon to reflect the location of interest selected by a user (step 206). In the exemplary embodiment, responsive to a user selecting a location of interest, each non-selected directional arrow of the directional arrow icon is resized proportionately to reflect the changed arrow properties at the selected location of interest (detailed in FIG. 3B). For example, the directional arrows associated with locations of interest, which may be located on the east side of a map image, will increase in length after the directional arrow icon is moved to a location of interest which may be located on the west side of a map image. In the exemplary embodiment, responsive to a user selecting a directional arrow, each location of interest that is not in the visible map area after it has been resized has a ghost image associated with the directional arrow. If the location of interest is in the visible range after the map has been resized, a map icon will be shown to indicate the location of interest on the map image. In other embodiments, the weight of each directional arrow and/or the color of each directional arrow changes (if using these directional arrow properties), along with the change in length of each directional arrow, to reflect the location of interest selected by the user.

If a directional arrow has not been selected by a user of the computing device (decision block 204, NO branch), map icon program 124 determines if the visible area of the map has been adjusted by a user (decision block 207). In the exemplary embodiment, a user selects a location of interest outside the visible map area to view in the same zoomed state by clicking the mouse device and dragging the cursor in the opposite direction of the directional arrow associated with the location of interest the user wishes to view. For example, a user may click a mouse device and drag the cursor in the opposite direction of the directional arrow at the desired location of interest, moving the desired location of interest into the visible map area while the map image remains in the same zoomed state (detailed in FIGS. 3C-3D). In other embodiments, a user moves the map image by using a function key on a keyboard and scrolling the mouse device, or by swiping the device display directly if using a touch device.

If the visible area of the map has been adjusted by a user (decision block 207, YES branch), map icon program 124 resizes the directional arrow icon based on the user adjustment (step 208). In the exemplary embodiment, responsive to a user adjusting the visible area of the map, map icon program 124 moves the directional arrow icon to the visible map area of the selected location of interest on the map image and resizes each directional arrow of the directional arrow icon to proportionately reflect the arrow properties at the selected location of interest. In the same embodiment, responsive to a user adjusting the visible area of the map, each location of interest that is not in the visible map area after it has been adjusted has a ghost image associated with the directional arrow. If the location of interest is in the visible range after the map has been adjusted, a map icon is shown to indicate the location of interest on the map image (detailed in FIGS. 3C-3D). In other embodiments, the weight of each directional arrow and/or the color of each directional arrow changes (if using these directional arrow properties), along with the change in length of each directional arrow, to reflect the location of interest selected by the user.

If the visible area of the map has not been adjusted by a user (decision block 207, NO branch), map icon program 124 ends.

Figure 3A:
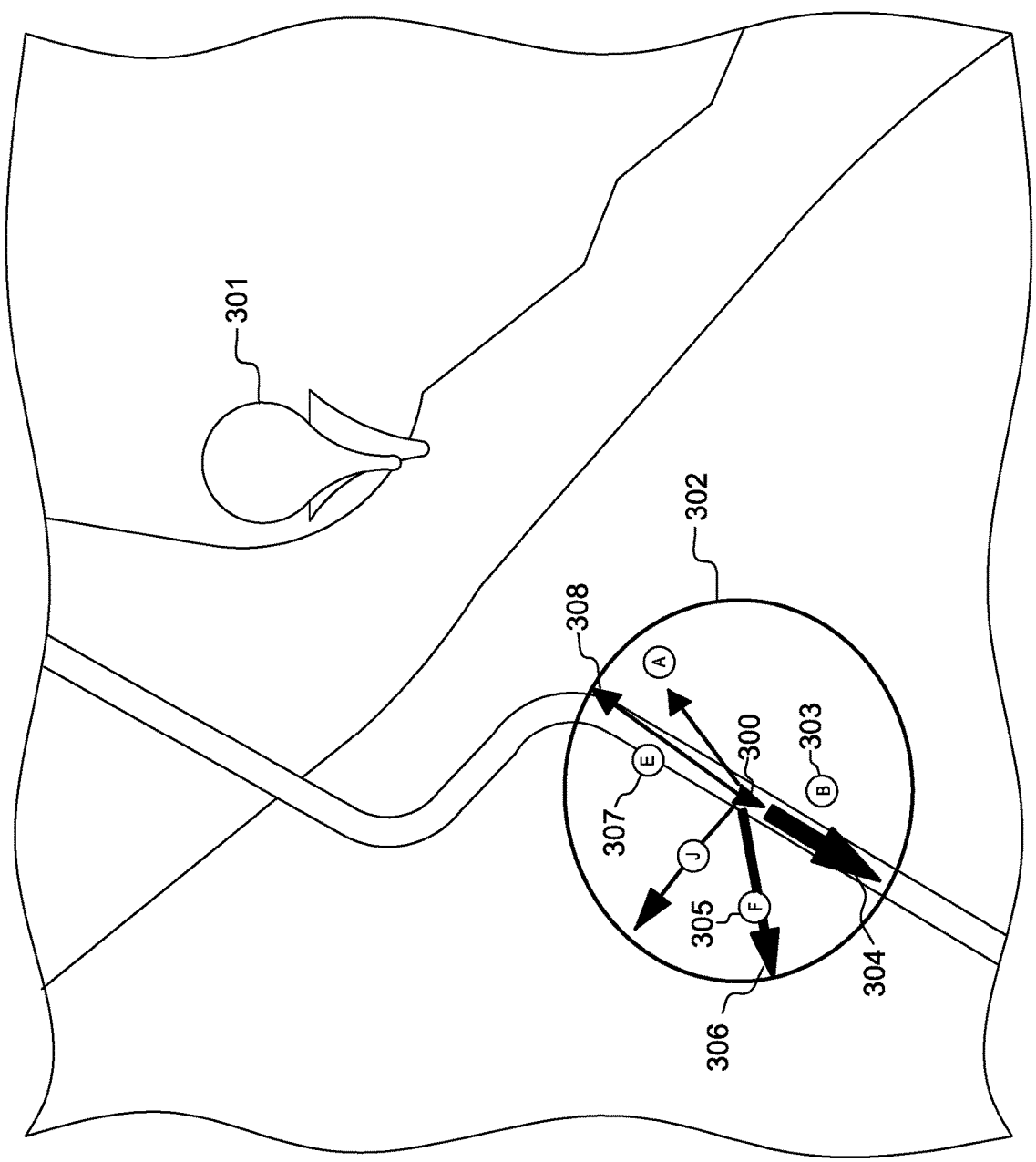
FIG. 3A is a map environment depicting an example of a directional arrow icon, in accordance with an embodiment of the present invention.

FIG. 3A is a map environment depicting an example of directional arrow icon 302, in accordance with an embodiment of the present invention. Point of origin 301 is a location determined by a user, and is the location from which the distance and direction to each location of interest is measured. Directional arrow icon 302 is a display icon which shows the direction and distance from point of origin 301 to each location of interest searched by a user. Directional arrow icon 302 includes directional arrows 304, 306, and 308, and map icons 303, 305, and 307. Map icons 303, 305, and 307 are associated with directional arrows 304, 306, and 308, respectively, and are transparent map images to represent a location of interest outside the visible map area. As depicted in FIG. 3A, the locations of interest associated with map icons 303, 305, and 307 are each outside the visible map area, and are shown as ghost images within directional arrow icon 302. Directional arrows 304, 306, and 308 are each arrows pointing in the direction of the respective location of interest. Cursor 300 is a cursor point in the map environment controlled by a user of the computing device, and is the center point of directional arrow icon 302 from which directional arrows 304, 306, and 308 originate.

In the exemplary embodiment, the length of each arrow, as well as the weight of each arrow, is proportionately reflective of the distance from the point of origin to the location of interest. For example, directional arrow 304 is the shortest arrow in length, and the heaviest arrow in weight, depicting the location of interest which is the closest in distance from the point of origin. Directional arrows 306 and 308 are proportionately longer and less heavy in weight than directional arrow 304, depicting that the locations of interest associated with directional arrows 306 and 308 are each proportionately further in distance from the point of origin than the location of interest associated with directional arrow 304.

Figure 3B:
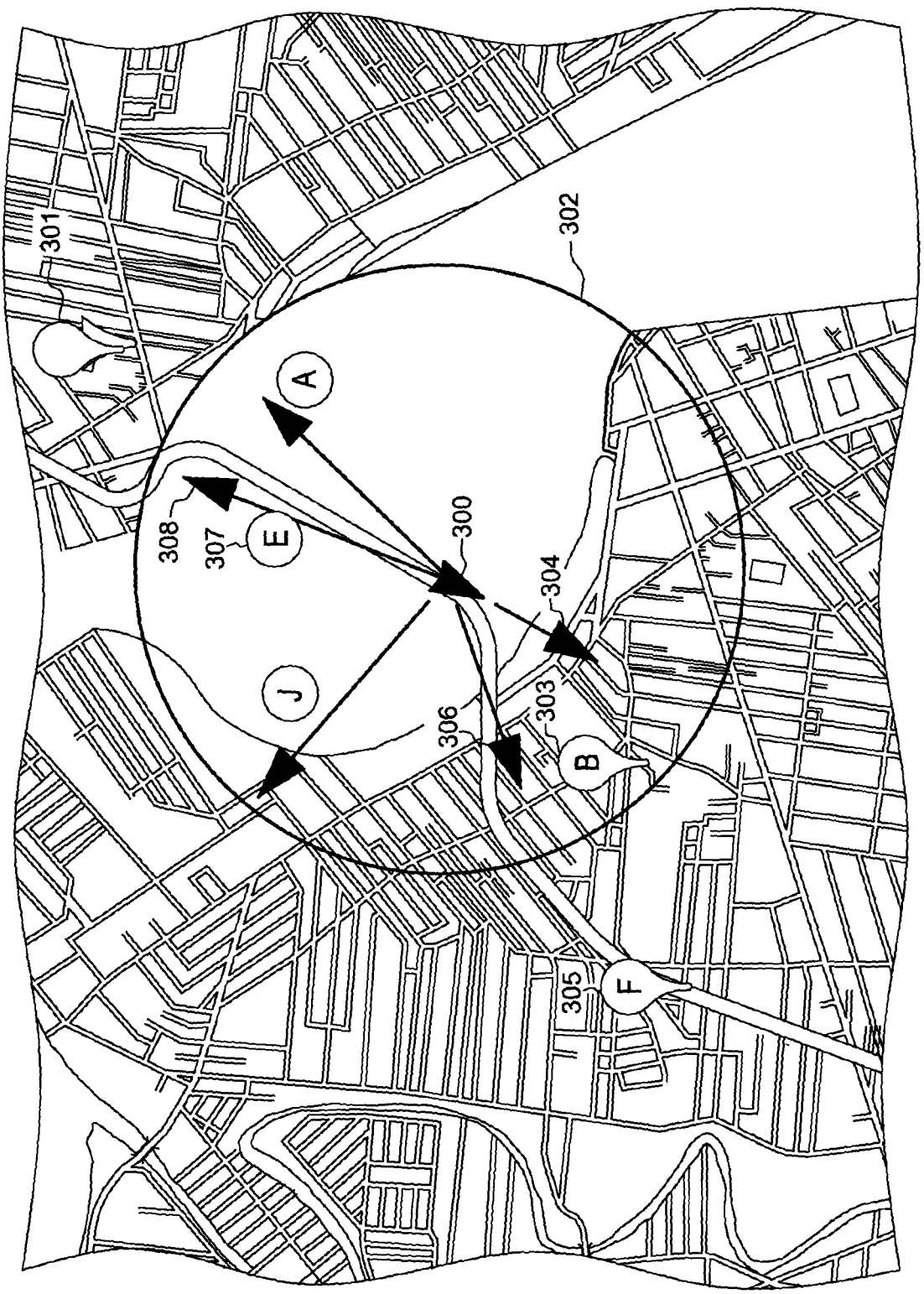
FIG. 3B is a map environment depicting an example of a directional arrow icon, after a user selects a location of interest from the map environment of FIG. 3A, in accordance with an embodiment of the present invention.

FIG. 3B is a map environment depicting an example of directional arrow icon 302, after a user selects a location of interest from the map environment of FIG. 3A, in accordance with an embodiment of the present invention. Point of origin 301 is a location selected by a user, and is the location from which the distance and direction to each location of interest is measured. Directional arrow icon 302 is a display icon, which shows the direction and distance to each location of interest, searched by a user, and includes directional arrows 304, 306, and 308 and map icons 303, 305, and 307. As depicted in FIG. 3B, map icon 307 is a ghost image, and is associated with directional arrow 308. Map icons 303 and 305, associated with directional arrows 304 and 306, respectively, depict a location of interest that is in the visible region of the map image, and do not have the accompanying transparent map images of a ghost image. Directional arrows 304, 306, and 308 are each arrows pointing in the direction of the respective location of interest. Cursor 300 is a cursor point in the map environment controlled by a user of the computing device, and is the center point of directional arrow icon 302 from which directional arrows 304, 306, and 308 originate.

In the exemplary embodiment, map icon 305 is the location of interest selected by a user, and the visible map area has been resized from the map environment of FIG. 3A, to fit map icon 305, associated with directional arrow 306, in the visible map area. Map icon 303 is the location of interest associated with directional arrow 304, and is automatically visible in the resized map, as it is located at a nearer distance to the point of origin than map icon 305, and is in the same general direction as map icon 305.

Figure 3D:
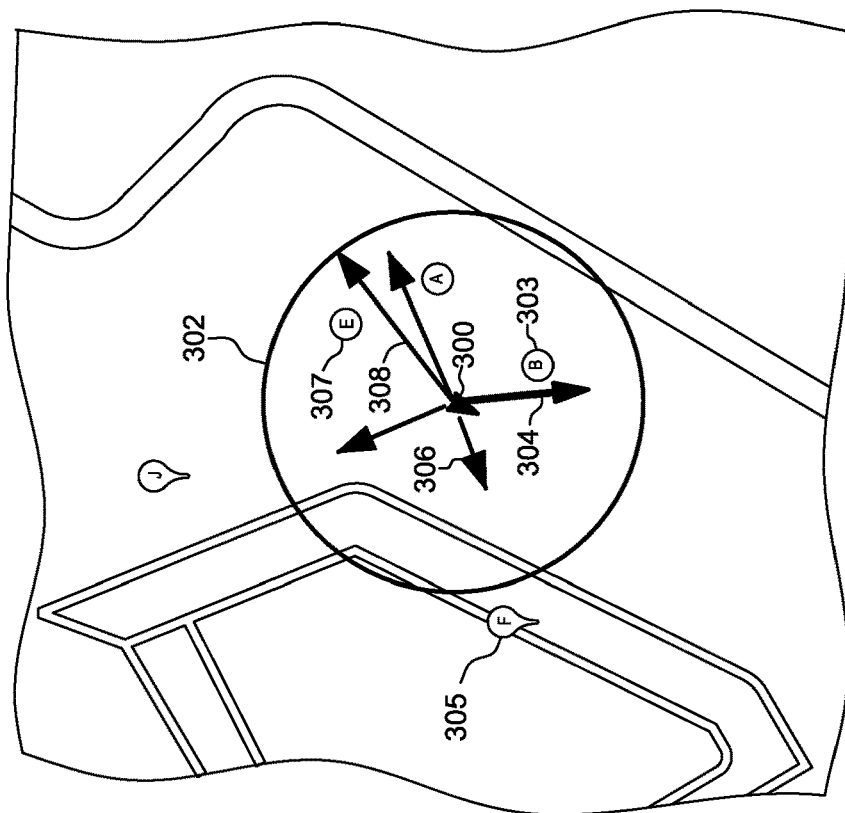
FIG. 3D is a map environment depicting an example of a directional arrow icon after a user adjusts the visible map area of FIG. 3C, in accordance with an embodiment of the present invention.
Figure 3C:
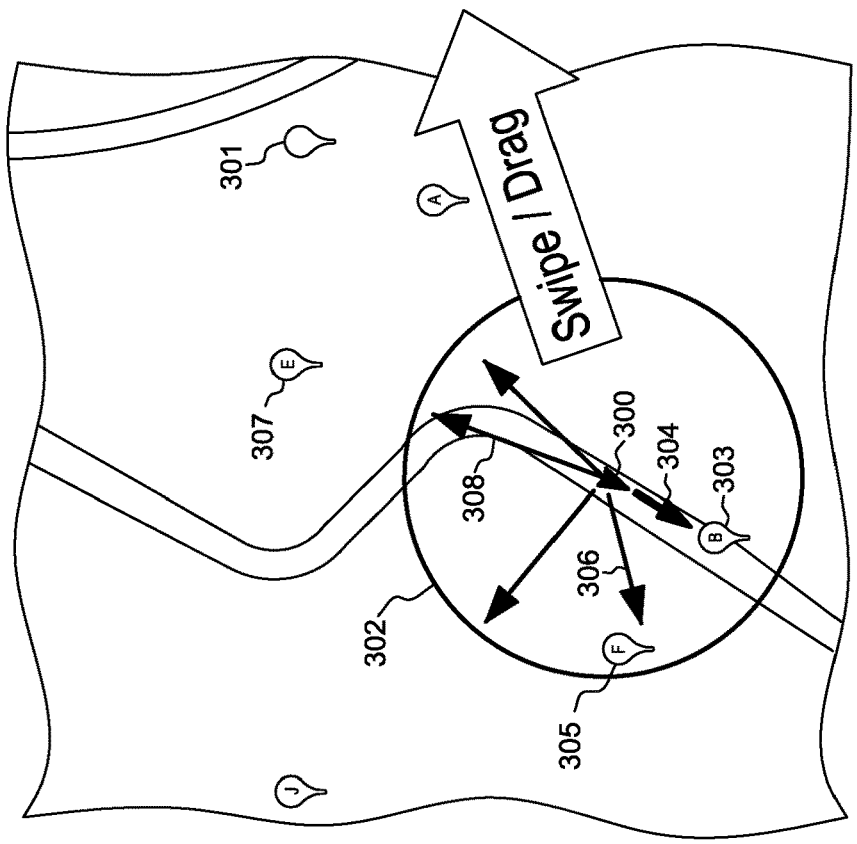
FIG. 3C is a map environment depicting an example of a directional arrow icon before a user adjusts the visible map area, in accordance with an embodiment of the present invention.

FIG. 3C is a map environment depicting an example of directional arrow icon 302 before a user adjusts the visible map area, in accordance with an embodiment of the present invention. Point of origin 301 is a location selected by a user, and is the location from which the distance and direction to each location of interest is measured. Directional arrow icon 302 is a display icon, which shows the direction and distance to each location of interest, searched by a user. Directional arrow icon 302 includes directional arrows 304, 306, and 308, each pointing in the direction of the respective location of interest, and map icons 303, 305, and 307, each reflecting a location of interest inside the visible map area. Map icons 303, 305, and 307 are associated with directional arrows 304, 306, and 308, respectively. Cursor 300 is a cursor point in the map environment controlled by a user of the computing device and is the center point of directional arrow icon 302 from which directional arrows 304, 306, and 308 originate.

FIG. 3D is a map environment depicting an example of directional arrow icon 302, after a user adjusts the visible map area of FIG. 3C, in accordance with an embodiment of the present invention. FIG. 3D remains in the same zoomed state as FIG. 3C, and directional arrow icon 302 in FIG. 3D includes directional arrows 304, 306, and 308, and map icons 303, 305, and 307. Map icon 305, the exemplary selected location of interest, is associated with directional arrow 306, and is within the visible map area. Map icons 303 and 307, associated with directional arrows 304 and 308, respectively, each reflect a location of interest outside the visible map area. Map icon 303 reflects a location of interest which remains outside the visible map area from FIG. 3C to FIG. 3D, while map icon 307 reflects a location of interest that is adjusted from inside the visible map area (map icon 307 in FIG. 3C), to outside the visible map area (map icon 307 in FIG. 3D). Directional arrows 304, 306, and 308 of FIG. 3D are each proportionately adjusted in direction and length from directional arrows 304, 306 and 308 of FIG. 3C, to reflect the direction and distance of each respective location of interest, from the selected location of interest (map icon 305). Cursor 300 is a cursor point in the map environment controlled by a user of the computing device and is the center point of directional arrow icon 302 from which directional arrows 304, 306, and 308 originate.

Figure 4:
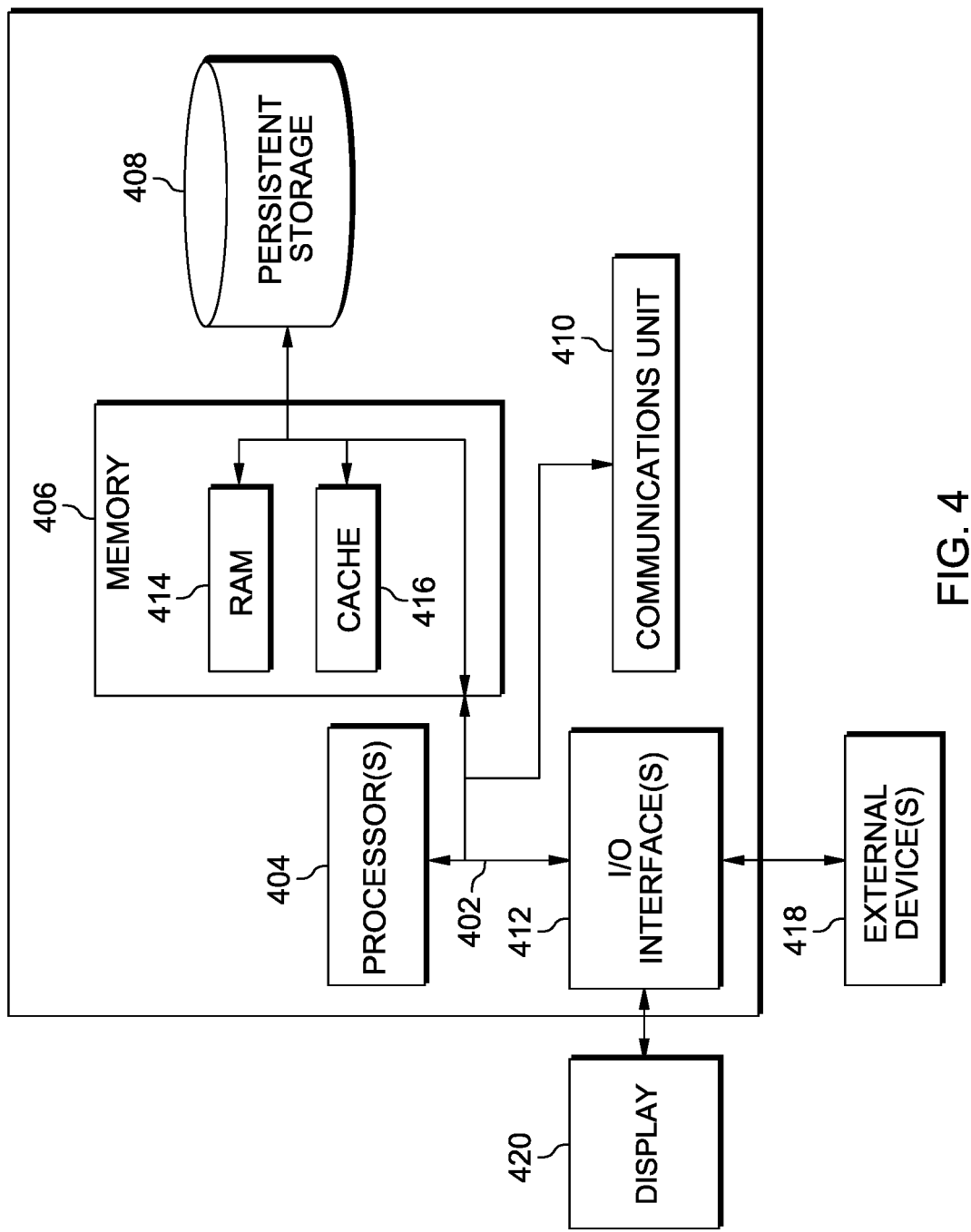
FIG. 4 depicts a block diagram of internal and external components of a data processing system, such as the client computing device of FIG. 1, in accordance with an embodiment of the present invention.

FIG. 4 depicts a block diagram of components of computing device 120 and map information server 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 120 and map information server 130 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

The programs user interface 122 and map icon program 124 in computing device 120, and programs map data files 131 in map information server 130 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including between computing device 120 and map information server 130. In these examples, communications unit 410 includes one or more network interface cards. Communications unit 410 may provide communications through the use of either or both physical and wireless communications links. The programs user interface 122 and map icon program 124 in computing device 120 and programs map data files 131 in map information server 130 may be downloaded to persistent storage 408 through communications unit 410.

I/O interface(s) 412 allows for input and output of data with other devices that may be connected to computing device 120 and map information server 130. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., the programs user interface 122 and map icon program 124 in computing device 120, and programs map data files 131 in map information server 130, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method comprising:
   receiving, by one or more processors, user input via a user interface comprising a search request from an origin point;
   in response to receiving the user input, communicating with a map information server to retrieve parameter information based on the search request, the parameter information comprising distances to a first location and a second location and additional information about a first point of interest at the first location and a second point of interest at the second location;
   generating a first directional arrow based on a direction of a first location corresponding to the search request;
   identifying second location based on a type of location corresponding to the search request;
   generating a second directional arrow based on a direction of the second location from the origin point;
   modifying a first set of display attributes of the first directional arrow based on the distance to the first location and the additional information about the first point of interest at the first location:
   modifying a second set of display attributes of the second directional arrow based on the distance to the second location and the additional information about the second point of interest at the second location; and
   displaying, on a map in the user interface, the second directional arrow, the second directional arrow displayed at a second position on the map to indicate the direction of the second location in relation to the origin point, wherein the second location is not shown in the map.

2. The method of claim 1, further comprising:
   obtaining a first average user rating of the first point of interest:
   obtaining a second average user rating of the second point of interest;
   modifying the first and second display attributes of the first and second directional arrows respectively to represent the first and second average user ratings.

3. The method of claim 1, further comprising:
   in response to selection of the second directional arrow, modifying a zoom level of the map presented on the user interface, resulting in a modified map, the modified map showing both the origin point and the second location.

4. The method of claim 1, wherein the first directional arrow is first length to indicate a distance of the first location from the origin point and the second directional arrow is a second length to indicate a distance of the second location from the origin point.

5. The method of claim 1, wherein the first directional arrow is first weight to indicate a distance of the first location from the origin point and the second directional arrow is a second weight to indicate a distance of the second location from the origin point.

6. The method of claim 1, further comprising:
   identifying the second location based on a second type of location specified in the search request.

7. The method of claim 6, wherein the first directional arrow is presented in a first color to represent a type of the first location and the second directional arrow is presented in a second color to represent a type of the second location.

8. The method of claim 1, further comprising:
   displaying the first directional arrow on the map, the first directional arrow displayed at a position on the map to indicate the direction of the first location in relation to the origin point, wherein the first location is not shown in the map.

9. The method of claim 8, further comprising:
in response to selection of the first directional arrow, modifying a zoom level of the map presented on the user interface, resulting in a modified map, the modified map showing both the origin point and the first location.

10. A system comprising:
one or more computer processors; and
one or more computer-readable mediums storing instructions that, when executed by the one or more computer processors, cause the system to perform operations comprising:
receiving, by one or more computer processors, user input via a user interface comprising a search request from an origin point;
in response to receiving the user input, communicating with a map information server to retrieve parameter information based on the search request, the parameter information comprising distances to a first location and a second location and additional information about a first point of interest at the first location and a second point of interest at the second location;
generating a first directional arrow based on a direction of a first location corresponding to the search request;
identifying second location based on a type of location corresponding to the search request;
generating a second directional arrow based on a direction of the second location from the origin point;
modifying a first set of display attributes of the first directional arrow based on the distance to the first location and the additional information about the first point of interest at the first location;
modifying a second set of display attributes of the second directional arrow based on the distance to the second location and the additional information about the second point of interest at the second location; and
displaying, on a map in the user interface, the second directional arrow, the second directional arrow displayed at a second position on the map to indicate the direction of the second location in relation to the origin point, wherein the second location is not shown in the map.

11. The system of claim 10, the operations further comprising:
modifying sizes of the first and second directional arrows respectively to represent first and second average user ratings associated with the first and second points of interest, respectively.

12. The system of claim 10, the operations further comprising:
modifying colors of the first and second directional arrows respectively to represent first and second average user ratings associated with the first and second points of interest, respectively.

13. The system of claim 10, the operations comprising:
detecting, via the user interface, a first selection of a specified key;
in response to detecting the first selection of the specified key, causing the first directional arrow to stop movement responsive to a pointing device and enabling selection of the first directional arrow;
after detecting the first selection of the specified key, detecting a second selection of the specified key; and
in response to detecting a second selection of the specified key after detecting the first selection of the specified key, causing the first directional arrow to revert back to following movement of the pointing device.

14. The system of claim 10, wherein the first directional arrow is first weight to indicate a distance of the first location from the origin point and the second directional arrow is a second weight to indicate a distance of the second location from the origin point.

15. The system of claim 10, the operations further comprising:
identifying the second location based on a second type of location specified in the search request.

16. The system of claim 15, wherein the first directional arrow is presented in a first color to represent a type of the first location and the second directional arrow is presented in a second color to represent a type of the second location.

17. A non-transitory computer-readable medium storing instructions that, when executed by one or more computer processors of one or more computing devices, cause the one or more computing devices to perform operations comprising:
receiving, by the one or more computer processors, user input via a user interface comprising a search request from an origin point;
in response to receiving the user input, communicating with a map information server to retrieve parameter information based on the search request, the parameter information comprising distances to a first location and a second location and additional information about a first point of interest at the first location and a second point of interest at the second location;
generating a first directional arrow based on a direction of a first location corresponding to the search request;
identifying second location based on a type of location corresponding to the search request;
generating a second directional arrow based on a direction of the second location from the origin point;
modifying a first set of display attributes of the first directional arrow based on the distance to the first location and the additional information about the first point of interest at the first location;
modifying a second set of display attributes of the second directional arrow based on the distance to the second location and the additional information about the second point of interest at the second location; and
displaying, on a map in a graphical the user interface, the second directional arrow, the second directional arrow displayed at a second position on the map to indicate the direction of the second location in relation to the origin point, wherein the second location is not shown in the map.

18. The non-transitory computer-readable medium of claim 17, the operations further comprising:
generation the second direction arrow based on the direction of the second location from the origin point.

19. The non-transitory computer-readable medium of claim 17, the operations further comprising:
in response to selection of the second directional arrow, modifying a zoom level of the map presented on the user interface, resulting in a modified map, the modified map showing both the origin point and the second location.

20. The non-transitory computer-readable medium of claim 17, wherein the first directional arrow is first length to indicate a distance of the first location from the origin point and the second directional arrow is a second length to indicate a distance of the second location from the origin point.

\* \* \* \* \*